(12) United States Patent
Liesen

(10) Patent No.: US 9,505,157 B2
(45) Date of Patent: Nov. 29, 2016

(54) INJECTION MOULD PRODUCT EJECTION APPARATUS AND METHOD

(75) Inventor: Martin Liesen, Ludenscheid (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 450 days.

(21) Appl. No.: 14/002,209

(22) PCT Filed: Mar. 30, 2011

(86) PCT No.: PCT/CN2011/000549
§ 371 (c)(1),
(2), (4) Date: Aug. 29, 2013

(87) PCT Pub. No.: WO2012/129726
PCT Pub. Date: Oct. 4, 2012

(65) Prior Publication Data
US 2013/0328245 A1 Dec. 12, 2013

(51) Int. Cl.
*B29C 45/40* (2006.01)

(52) U.S. Cl.
CPC ............. *B29C 45/40* (2013.01); *B29C 45/401* (2013.01); *B29C 2045/4057* (2013.01); *B29C 2045/4063* (2013.01)

(58) Field of Classification Search
CPC ...................................................... B29C 45/40
See application file for complete search history.

(56) References Cited

U.S. PATENT DOCUMENTS

2003/0003185 A1   1/2003   Muller
2003/0211196 A1   11/2003  Muller

FOREIGN PATENT DOCUMENTS

| EP | 1 287 965 A1 | 3/2003 |
| JP | 2001-239559 A | 9/2001 |
| JP | 2010-260277 A | 11/2010 |

OTHER PUBLICATIONS

International Search Report (PCT/ISA/210) issued on Jan. 5, 2012, by the China Patent Office as the International Searching Authority for International Application No. PCT/CN2011/000549.

*Primary Examiner* — Larry Thrower
(74) *Attorney, Agent, or Firm* — Buchanan Ingersoll & Rooney PC

(57) ABSTRACT

An injection mold product ejection apparatus comprising: an ejection element; and a displacing member for displacing the ejection element between a retracted molding position and a first extended ejection position; wherein, the ejection element is an ejection assembly and comprises: a) an inner ejection sub-assembly, and b) an outer ejection bush surrounding the inner ejection sub-assembly, said displacing member comprises: a collective displacing member, for displacing the whole ejection assembly from the retracted molding position to an intermediate ejection position, and a sub-assembly displacing member, for converting the ejection assembly from the intermediate ejection position to the first extended ejection position by extending the sub-assembly relative to the outer ejection bush.

10 Claims, 6 Drawing Sheets

INJECTION MOULD PRODUCT EJECTION APPARATUS AND METHOD

The present invention pertains to an injection mould product ejection apparatus comprising an ejection element and a displacing member for displacing the ejection element between a retracted moulding position and a first extended ejection position, and to an injection mould product ejection method.

Such an apparatus and method are known from document JP 2001 239 559. This document discloses an injection moulding tool for producing loudspeaker diaphragms. The tool includes an ejection sleeve with a wide ejection surface compared to the ejection surface provided by ejection pins. After moulding is finished, thanks to the wider ejection surface, the loudspeaker diaphragm can be ejected from the tool without the risk of rupturing the diaphragm.

This known ejection system is an improvement with respect to ejection systems using simple ejection pins. However, it is only adapted for relatively simple injection mould products, such as diaphragms. It is not suitable for more complicated injection mould products, such as automotive interior parts with intricate structures such as loudspeaker grills.

An object of the present invention is therefore to provide an injection mould product ejection apparatus capable of ejecting particularly fragile or intricate injection mould products reliably and safely, without any damage to said products.

This object is achieved by an apparatus and method of the afore-mentioned type, the apparatus being characterised in that the ejection element is an ejection assembly and comprises an inner ejection sub-assembly, and an outer ejection bush surrounding the inner ejection sub-assembly, and in that said displacing member comprises a collective displacing member, for displacing the whole ejection assembly from the retracted moulding position to an intermediate ejection position, and a sub-assembly displacing member, for converting the ejection assembly from the intermediate ejection position to the first extended ejection position by extending the sub-assembly relative to the outer ejection bush, and the method being characterised in that two adjacent and different surface regions of the injection mould product are sequentially separated from the injection mould.

According to preferred embodiments, the apparatus of the invention has one or several of the following features, taken in isolation or in all technically possible combinations:

the ejection sub-assembly has a central ejection stud and an intermediate ejection sleeve surrounding the central ejection stud;

the displacing member further comprises a stud displacing member, for further converting the ejection assembly from the first extended ejection position to a second extended ejection position by extending the central ejection stud relative to the intermediate ejection sleeve;

the stud displacing member comprises a guiding cavity and a limit stop for the central ejection stud inside the intermediate ejection sleeve;

the collective displacing member comprises guiding elements and a limit stop for the outer ejection bush;

the sub-assembly displacing member comprises a driving member for extending the sub-assembly relative to the outer ejection bush, a connecting member for connecting the sub-assembly with the driving member and transmitting the driving force from the driving member to the sub-assembly, a lock for locking the sub-assembly in the retracted position, and a limit stop for limiting the extension of the sub-assembly;

the driving member is a spring, and in particular a coil spring;

the connecting member comprises a sliding rod, one end of the sliding rod being connected to the sub-assembly, and the other end being connected to the driving member;

a clamping plate, the sliding rod having a spring housing slidably located inside a cavity of the clamping plate, the spring being located inside the spring housing and urging the spring housing towards the outside of the clamping plate, and the limit stop comprising an annular protruding step of the spring housing and a complementary projecting step of the clamping plate cavity;

the lock comprises a sliding carriage adapted to be engaged and disengaged from the connecting member, and a driving assembly for engaging and disengaging the sliding carriage;

the driving assembly comprises a moving ejection plate carrying the sliding carriage, and a fixed cam member, the sliding carriage being adapted for following the cam surface defined by the fixed cam member.

Similarly, the method of the invention may include one or several of the following features:

the injection mould product is subdivided, from the outside to the inside, into four different surface regions of increasingly smaller surface area, and, starting from the outside, the four surface regions are sequentially separated from the injection mould;

the injection mould product is an automotive interior part;

the automotive interior part comprises a loudspeaker grill, and the three inner surface regions correspond to the loudspeaker grill.

The invention will be better understood when reading the following description of a non limiting example of the invention, with reference to the accompanying drawings, in which.

Figure 1:
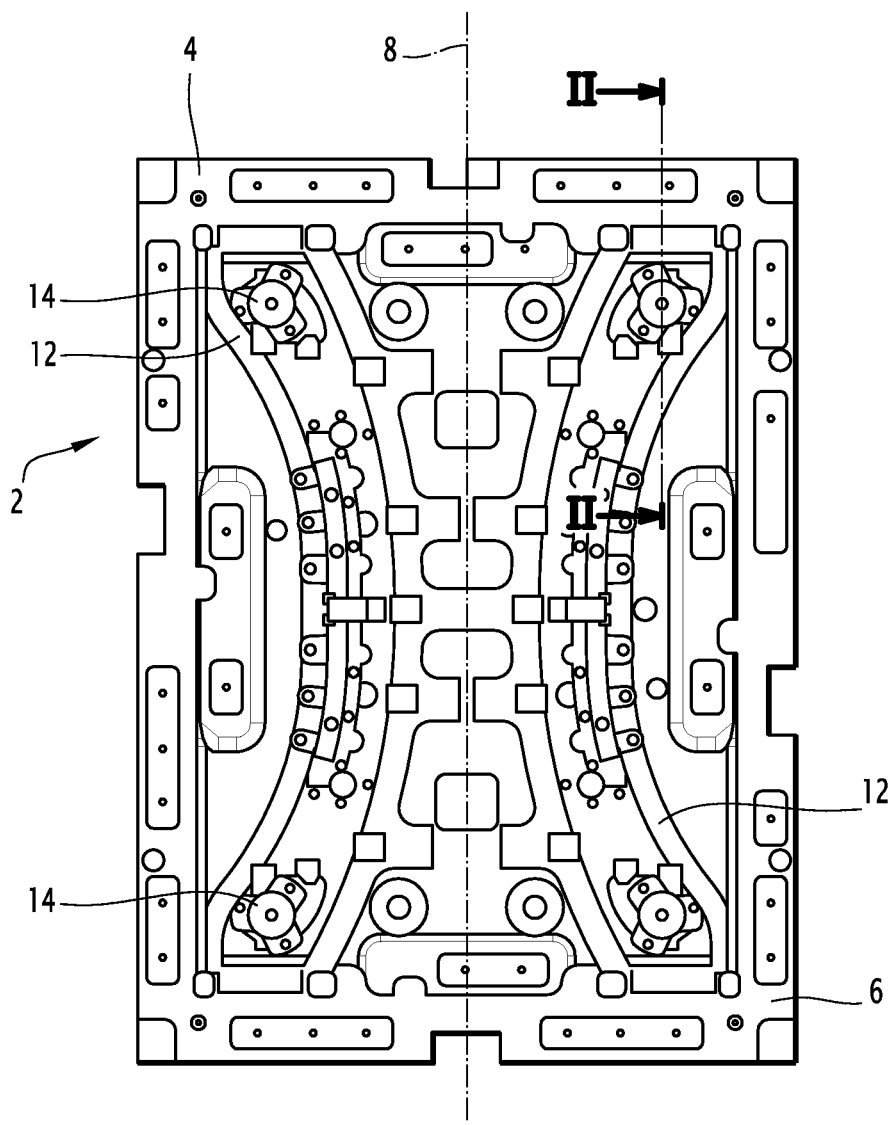
FIG. 1 is a top view of the core part of an injection moulding tool according to the invention.

With reference to FIG. 1, there is shown the core part 2 of an injection moulding tool according to the invention. The injection moulding tool also comprises a cavity part (not shown), which is complementary to the core part. During product moulding, the cavity part is lowered onto the core part, and a plastics material is injected in between the two parts in order to produce the desired product.

In the example shown in FIG. 1, the core part 2 is subdivided into a left side 4 and a right side 6, the two sides being symmetrical about the centre axis 8 of the core part 2. Each side defines a moulding cavity 12, which is roughly banana-shaped. Each moulding cavity 12 is used to produce a duct cover for automotive interiors.

The core part 2 includes four areas 14, each defining a mould for the shaping of a loudspeaker grill inside the injection mould product. An injection mould product ejection apparatus is arranged below and inside the core part 2.

Figure 2:
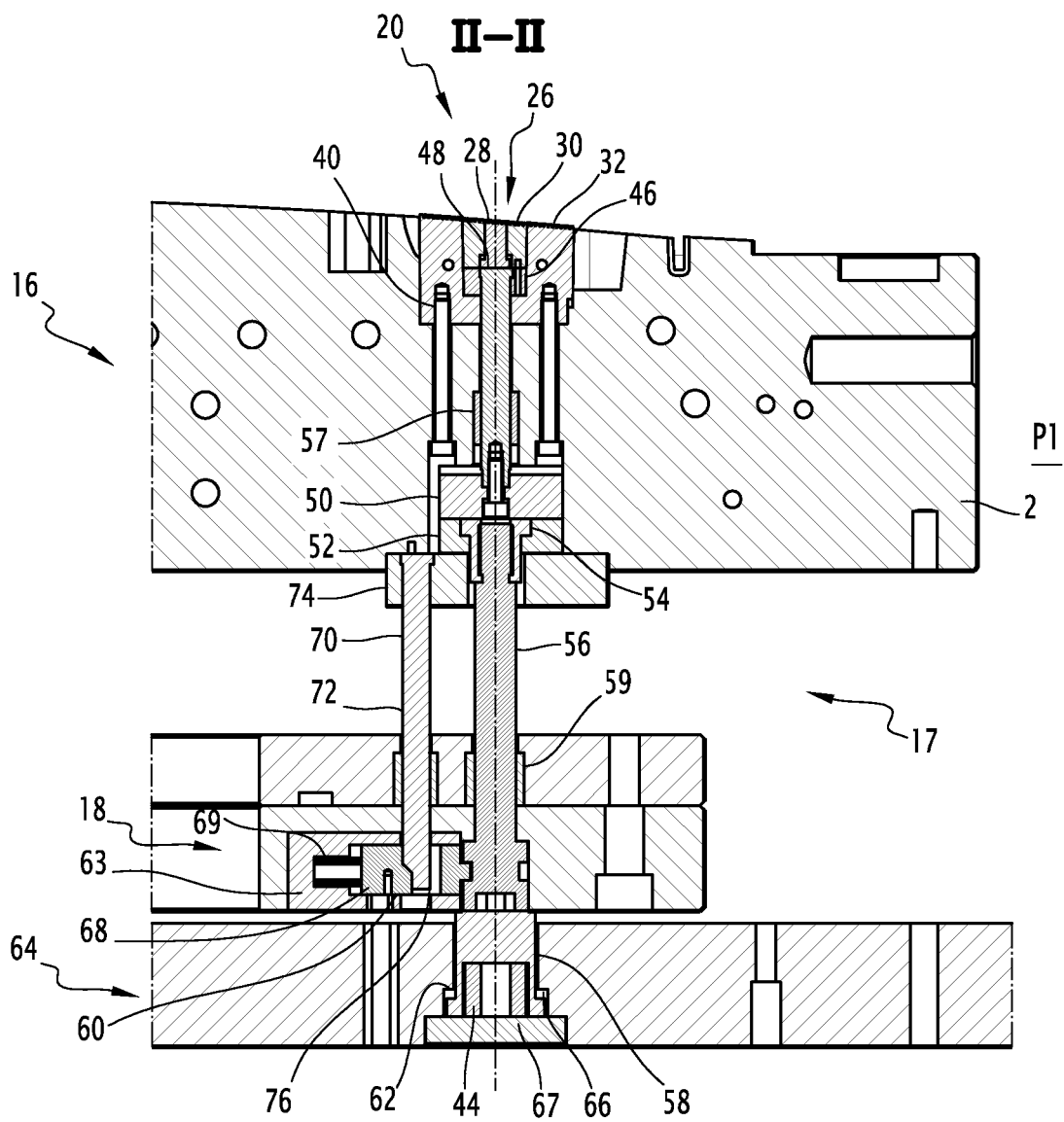
FIG. 2 is a partial sectional view of an injection mould product ejection apparatus according to the invention, taken along the line II-II of FIG. 1.

Referring now to FIG. 2, there is shown a detail of the injection mould product ejection apparatus 16 of the present invention. FIG. 2 only represents the ejection mechanism 17 for one of the loudspeaker areas 14, the ejection mechanisms for the other loudspeaker areas being identical.

The ejection apparatus 16 has an ejection plate 18 located below the core part 2. The ejection plate 18 is connected to the four ejection mechanisms 17 for the loudspeaker areas 14, as well as to several ejection pins (not shown) that are used for ejecting the remaining areas of the injection mould product.

The ejection mechanism 17 comprises an ejection element, namely an ejection assembly 20 slidably inserted in the core part 2, as well as a member for displacing the ejection assembly 20.

Figure 3:
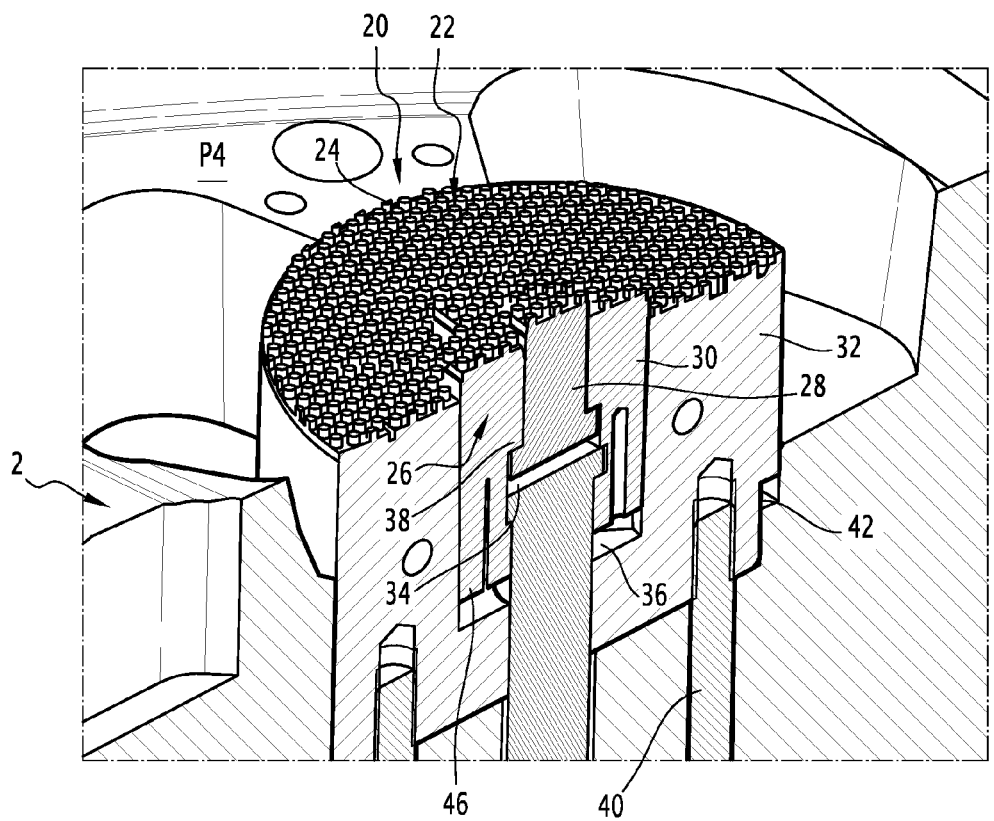
FIG. 3 is a perspective, sectional view of the ejection assembly used in the ejection apparatus of the present invention.

With reference to FIG. 3, the outer surface 22 of ejection assembly 20 forms a moulding die for shaping a loudspeaker grill. The outer surface 22 consists of a multitude of stubs 24 defining the holes of the loudspeaker grill.

The ejection assembly 20 comprises a sub-assembly 26 having a central ejection stud 28 and an intermediate ejection sleeve 30, as well as an outer ejection bush 32. The intermediate ejection sleeve 30 surrounds the central ejection stud 28, and the outer ejection bush 32 surrounds the intermediate ejection sleeve 30.

In other words, the stud 28, the sleeve 30 and the bush 32 have a concentric and nested configuration, wherein the stud 28 is slidably received within a stud guiding cavity 34 of the sleeve 30, and the sleeve 30 is slidably received within a sleeve guiding cavity 36 of the bush 32. The stud guiding cavity 34 defines a limit stop 38 for limiting the displacement of the stud 28 inside the stud guiding cavity 34.

Referring back to FIG. 2, the member for displacing the ejection assembly 20 is subdivided into a collective displacing member for displacing the whole ejection assembly 20, a sub-assembly displacing member for extending the sub-assembly 26 relative to the outer ejection bush 32, and a stud displacing member for extending the central ejection stud 28 relative to the intermediate ejection sleeve 30.

The collective displacing member comprises guiding elements, such as screws 40, which connect the bush 32 to the core part 2. The screw connection is such as to allow a certain vertical movement of the bush 32 inside the core part 2. A limit stop 42 (cf. FIG. 3) is provided at the core part 2 in order to limit the upward vertical movement of the outer ejection bush 32.

The stud displacing member includes the already mentioned stud guiding cavity 34 and corresponding limit stop 38.

The sub-assembly displacing member comprises a driving member 44, a connecting member 46, 48, 50, 52, 54, 56 and 58 for connecting the sub-assembly with the driving member 44, a lock 60 for locking the sub-assembly in the retracted position, and a limit stop 62 for limiting the extension of the sub-assembly.

Preferably, the driving member is a spring 44, and in particular a compression coil spring.

The connecting member includes a first linking plate 46, an upper sliding rod 48, second and third linking plates 50 and 52, an adapter 54, a lower sliding rod 56 and a spring housing 58.

A first bearing 57 is provided for guiding the upper sliding rod 48, and a second bearing 59 is provided for guiding the lower sliding rod 56.

The first linking plate 46 links the intermediate ejection sleeve 30 to the upper sliding rod 48. The second and third linking plates 50, 52 and the adapter 54 connect the upper sliding rod 48 with the lower sliding rod 56. The spring housing 58 receives the coil spring 44 and links the lower sliding rod 56 to the coil spring 44.

The ejection apparatus 16 also includes a clamping plate 64. The spring housing 58 is slidably located inside a cavity 66 of the clamping plate. Spring 44 rests on a base plate 67 inserted in the clamping plate 64 and urges the spring housing 58 towards the outside of the clamping plate 64.

The limit stop 62 comprises an annular protruding step of the spring housing 58 and a complementary projecting step of the clamping plate cavity 66.

The lock 60 comprises a sliding carriage 68 adapted to be engaged and disengaged from the lower sliding rod 56, and a driving assembly 18, 70 for engaging and disengaging the carriage 68.

The carriage 68 is guided by a rail 69 inside a carriage housing 63. The carriage housing 63 is inserted into the ejection plate 18.

The driving assembly comprises the ejection plate 18 and a rod-like cam member 70. The cam member 70 is secured to the core part 2 via a fixing plate 74. Cam member 70 defines a cam surface 72.

The sliding carriage 68 has a guiding cavity 76 into which the lower end of the cam member 70 is inserted. The surface of the guiding cavity 76 is adapted to the cam surface 72 such that the sliding carriage 68 forms a cam follower for following the cam surface 72.

With reference to FIGS. 2 and 4 to 6, the injection mould product ejection process carried out by the ejection apparatus 16 will now be described.

Figure 4:
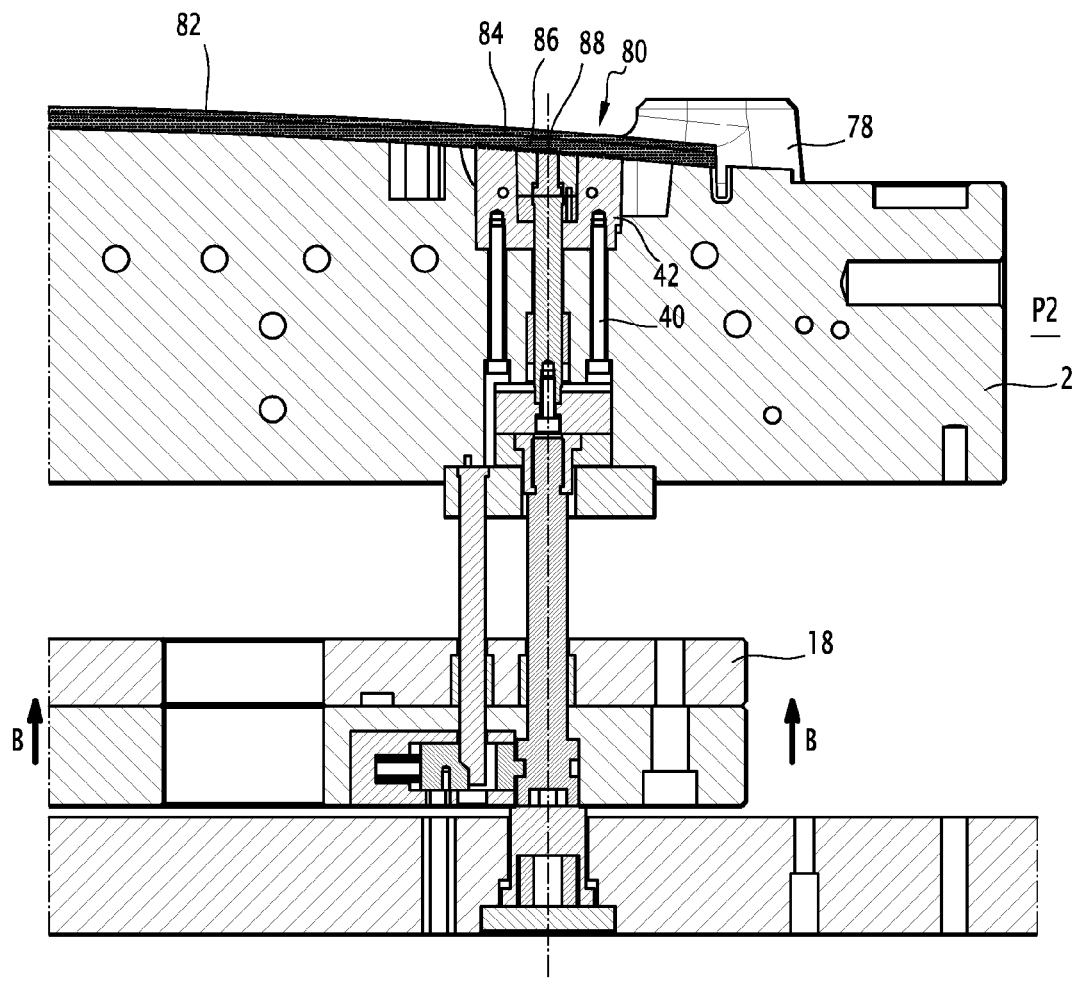
FIGS. 4 to 6 show different steps of the ejection process when using the ejection apparatus of FIG. 2.

FIG. 4 shows the injection mould product 78 on the core part 2 during ejection, after completion of the moulding process. In this particular example, the injection mould product is a duct cover 78 for automotive interiors including a speaker grill 80. The speaker grill 80 has been moulded into the duct cover 78 via the outer surface 22 of ejection assembly 20 (cf. FIG. 3).

The speaker grill 80 is an intricate structure with a large number of small holes defined by the stubs 24. Accordingly, when ejecting the duct cover 78 from the core part 2, great care must be taken in order to prevent any damage to the speaker grill 80. The safe ejection of speaker grill 80 from the surface 22 of the ejection assembly 20 is particularly challenging since the plastic material defining the numerous holes of the speaker grill 80 shrinks onto the stubs 24 as it cools down. Hence, as time goes by, there is an increasingly high adhesive force between the speaker grill 80 and the surface 22, which must be overcome without breaking the speaker grill 80.

In the preferred embodiment of the ejection process of the invention, the safe ejection of the speaker grill 80 from the core part 2 is achieved in three steps.

The ejection apparatus starts from a retracted moulding position P1 shown in FIG. 2. When moulding is completed, the ejection process starts with a first step shown in FIG. 4, wherein the ejection plate 18 ascends as indicated by arrows B. Usual ejection pins (not shown) connected to ejection plate 18 protrude from the core part 2 and eject an outer surface region 82 of the duct cover 78.

Three inner surface regions 84, 86 and 88, which correspond to the loudspeaker grill, remain attached to the ejection assembly 20 due to the high adhesive forces. Thanks to the collective displacing member, i.e. the guiding screws 40 and the limit stop 42, the ejection assembly 20 is pulled out of the core part 2 up to the intermediate ejection position P2 defined by the limit stop 42 and shown in FIG. 4.

Figure 5:
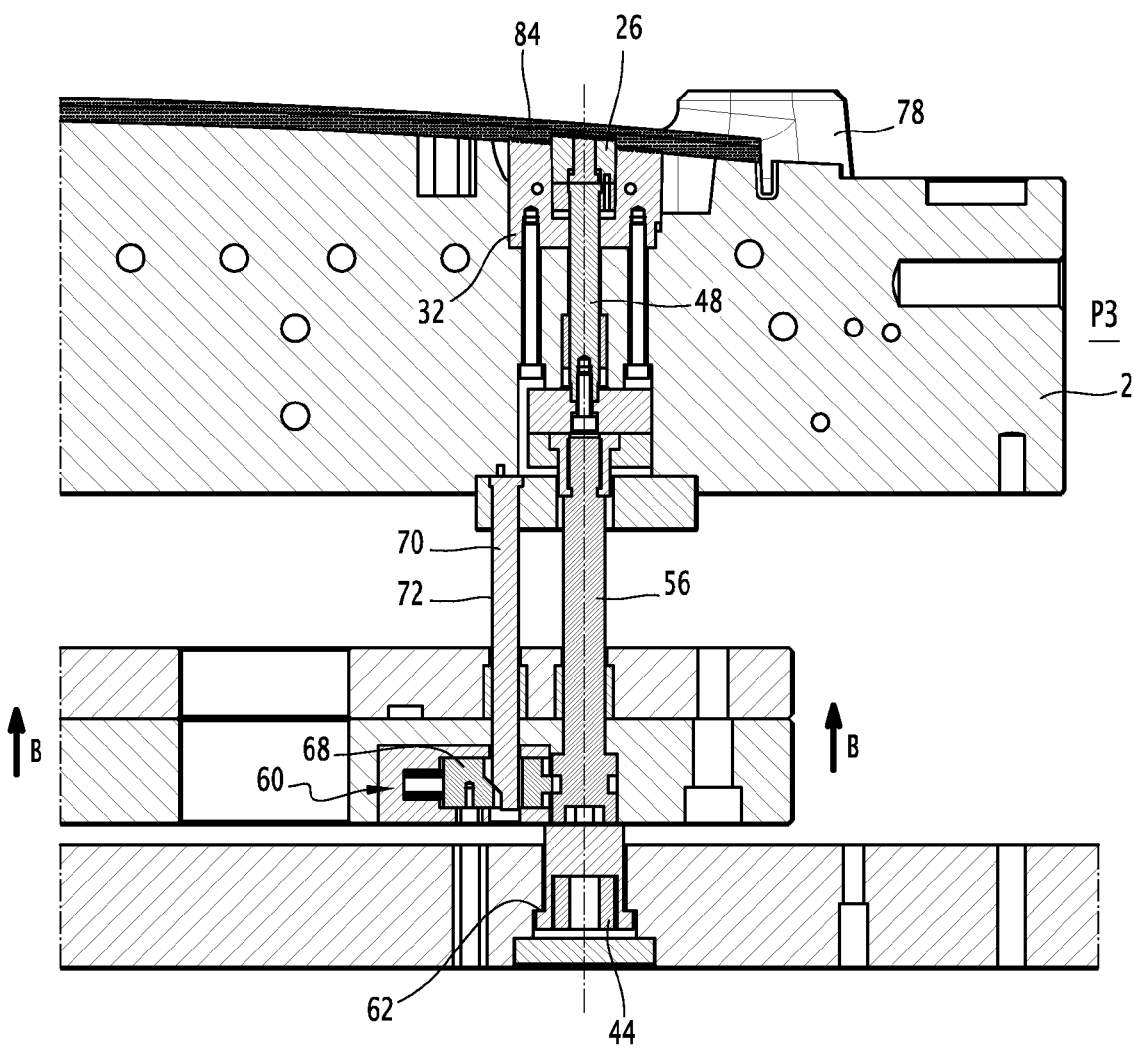

In the second step, the ejection plate 18 rises further such that the sliding carriage 68 of the lock 60 is disengaged from the lower sliding rod 56 by following the cam surface 72 of the cam member 70. The sliding rods 56 and 48 then slide upwards due to the urging force of compression spring 44 resulting in an extension of the ejection sub-assembly 26 relative to the outer ejection bush 32. This extension is limited by the limit stop 62. At the end of the second step, the ejection assembly has reached a first extended ejection position P3, as shown in FIG. 5, and the surface region 84 of the product 78 is separated from the ejection assembly 20.

In the third step, the ejection plate rises even further, and, due to the ensuing further action of the standard ejection pins (not shown) distributed inside core part 2 and acting on the outer surface region 82, the product 78 is further elevated.

The effect is an extension of the central ejection stud 28 relative to the intermediate ejection sleeve 30. Indeed, due to the high adhesive forces, the inner surface region 88 of the product 78 sticks to ejection stud 28 and the latter is allowed to be pulled out of the intermediate ejection sleeve 30 thanks to the stud displacing member, i.e. the guiding cavity 34 and the limit stop 38 (cf. FIG. 3).

Figure 6:
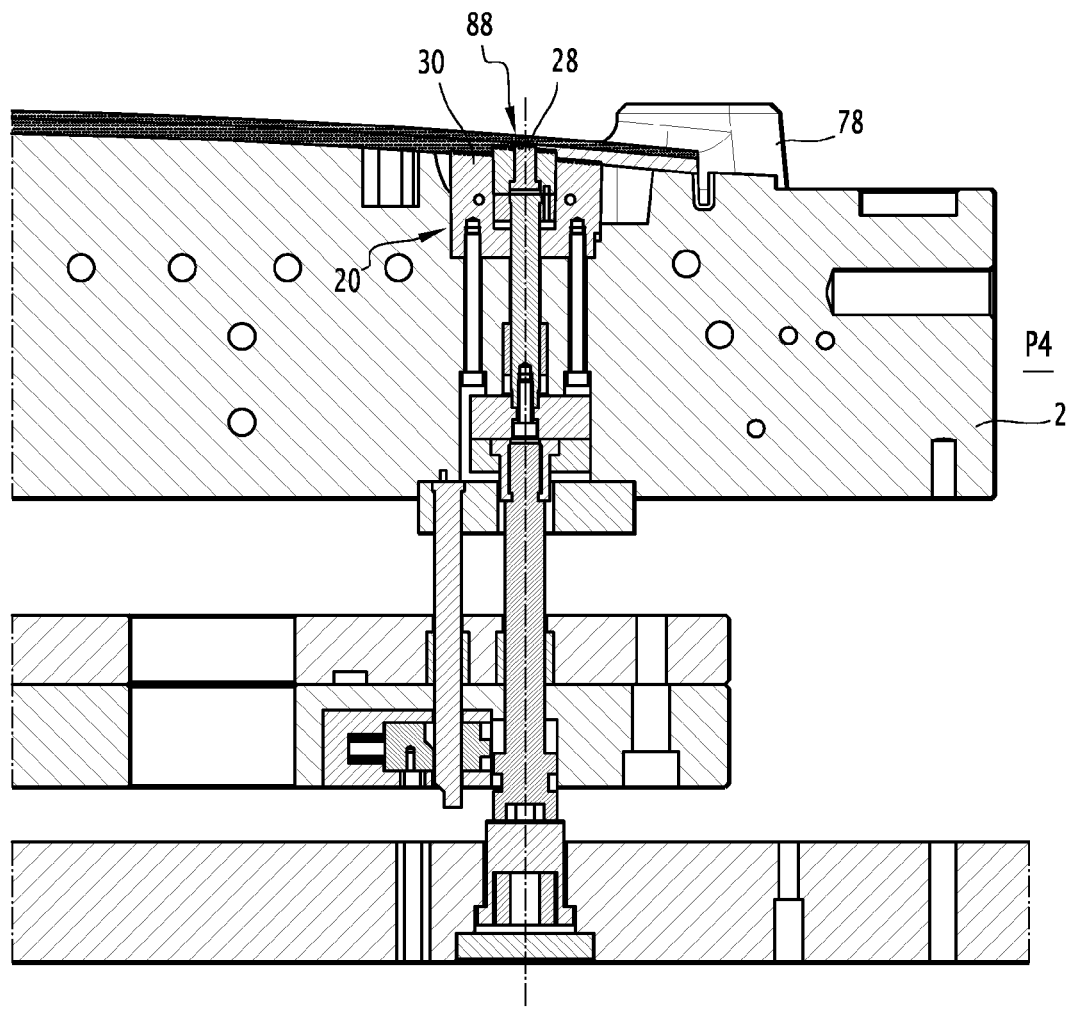

At the end of the third step, the ejection assembly 20 has reached the second extended ejection position P4 shown in FIG. 6, and the surface region 86 of the product 78 is separated from the ejection assembly 20.

After completion of the third step, the ejected product 78 can then be removed from the core part 2.

The amplitude of the displacement between positions P1 and P2, positions P2 and P3, and/or positions P3 and P4 is preferably between 2 and 10 mm, and most preferably between 3 and 8 mm.

The injection mould product ejection process as described above has the particular advantage that the three inner surface regions 84, 86, 88 are ejected in the order of decreasing surface area. Accordingly, the largest surface area of the loudspeaker grill corresponding to inner surface region 84 is ejected first, then the second largest surface area corresponding to inner surface region 86, and finally the smallest surface area corresponding to inner surface region 88, thus minimising the risk of any undesired deformation or breakage.

The invention claimed is:

1. An injection mould product ejection apparatus comprising:
   an ejection element; and
   a displacing member for displacing the ejection element between a retracted moulding position and a first extended ejection position;
   wherein:
   the ejection element is an ejection assembly and comprises:
   a) an inner ejection sub-assembly,
   b) an outer ejection bush surrounding the inner ejection sub-assembly, and
   c) an outer surface forming a moulding die for shaping the injection mould product,
   said displacing member comprises:
   a) a collective displacing member, for displacing the whole ejection assembly from the retracted moulding position to an intermediate ejection position, and
   b) a sub-assembly displacing member, for converting the ejection assembly from the intermediate ejection position to the first extended ejection position by extending the sub-assembly relative to the outer ejection bush,
   wherein the sub-assembly displacing member comprises:
   a driving member for extending the sub-assembly relative to the outer ejection bush,
   a connecting member for connecting the sub-assembly with the driving member and transmitting the driving force from the driving member to the sub-assembly,
   a lock for locking the sub-assembly in the retracted position, and
   a limit stop for limiting the extension of the sub-assembly.

2. The apparatus of claim 1, wherein the ejection sub-assembly has a central ejection stud and an intermediate ejection sleeve surrounding the central ejection stud.

3. The apparatus of claim 2, wherein the displacing member further comprises a stud displacing member, for further converting the ejection assembly from the first extended ejection position to a second extended ejection position by extending the central ejection stud relative to the intermediate ejection sleeve.

4. The apparatus of claim 3, wherein the stud displacing member comprises a guiding cavity and a limit stop for the central ejection stud inside the intermediate ejection sleeve.

5. The apparatus of claim 1, wherein the collective displacing member comprises guiding elements and a limit stop for the outer ejection bush.

6. The apparatus of claim 1, wherein the driving member is a spring, and in particular a coil spring.

7. The apparatus of claim 1, wherein the connecting member comprises a sliding rod, one end of the sliding rod being connected to the sub-assembly, and the other end being connected to the driving member.

8. The apparatus of claim 6 in combination, further comprising a clamping plate, the sliding rod having a spring housing slidably located inside a cavity of the clamping plate, the spring being located inside the spring housing and urging the spring housing towards the outside of the clamping plate, and the limit stop comprising an annular protruding step of the spring housing and a complementary projecting step of the clamping plate cavity.

9. The apparatus of claim 1, wherein the lock comprises a sliding carriage adapted to be engaged and disengaged from the connecting member, and a driving assembly for engaging and disengaging the sliding carriage.

10. The apparatus of claim 9, wherein the driving assembly comprises:
   a moving ejection plate carrying the sliding carriage; and
   a fixed cam member,
   the sliding carriage being adapted for following the cam surface defined by the fixed cam member.

* * * * *